July 2, 1929.  D. J. MILLS  1,719,482
WEIGHING MACHINE
Filed July 18, 1927  2 Sheets-Sheet 1
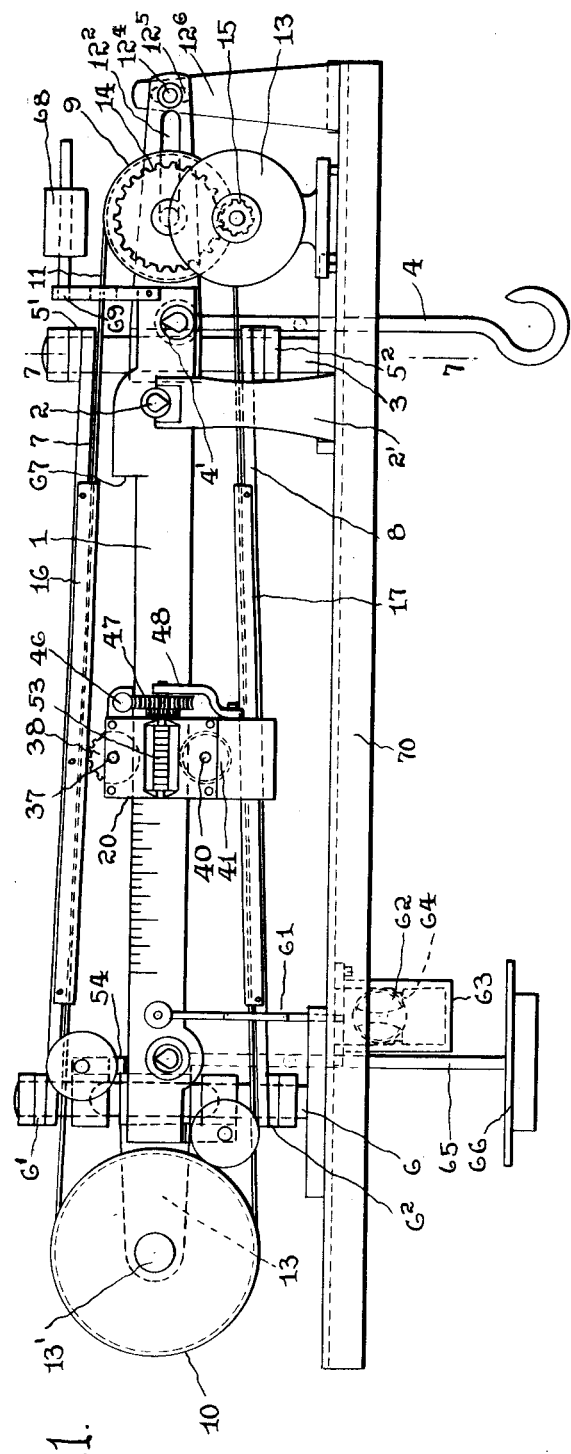
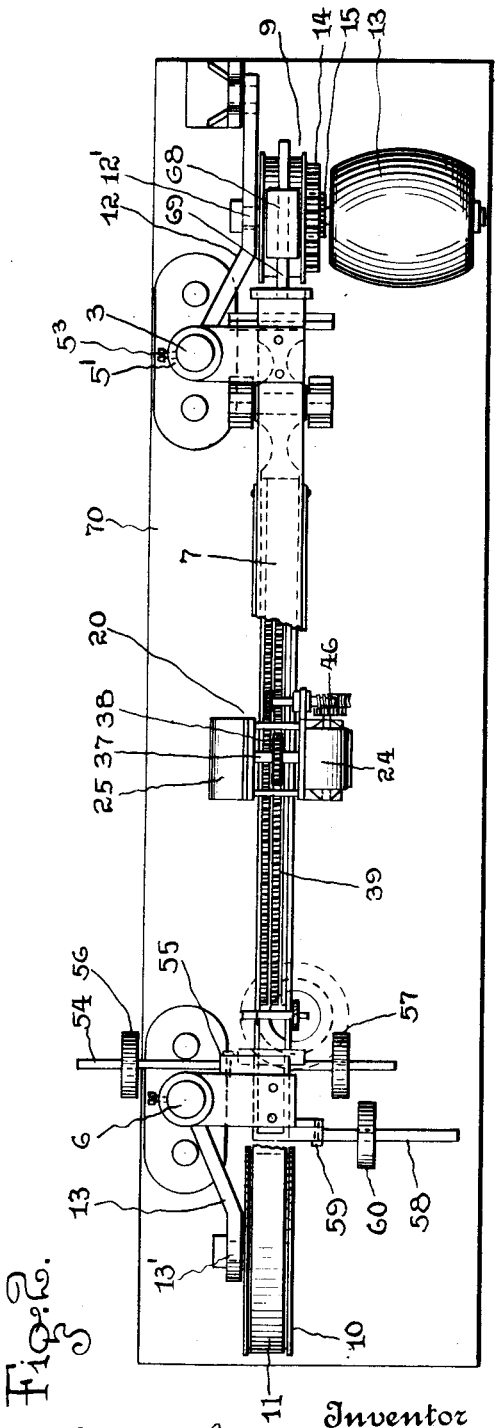
Inventor
David John Mills
By his Attorney July 2, 1929.  D. J. MILLS  1,719,482
WEIGHING MACHINE
Filed July 18, 1927   2 Sheets-Sheet 2
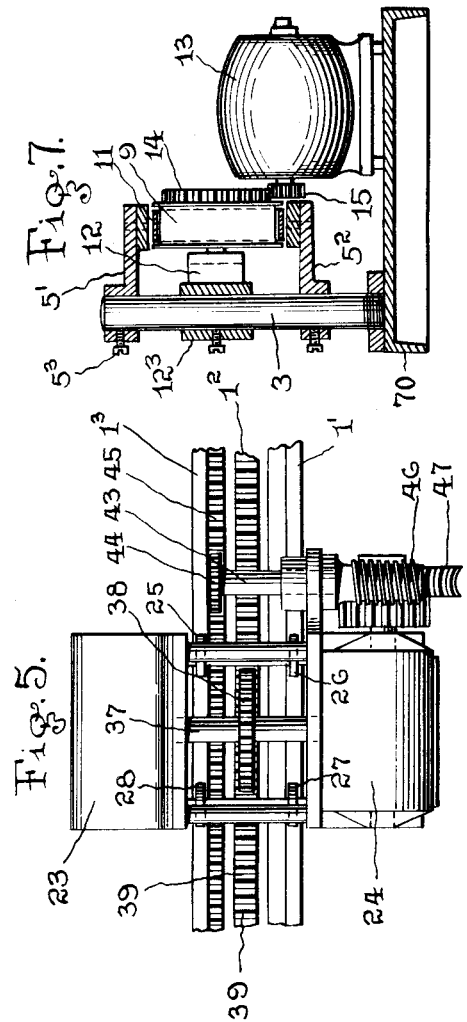
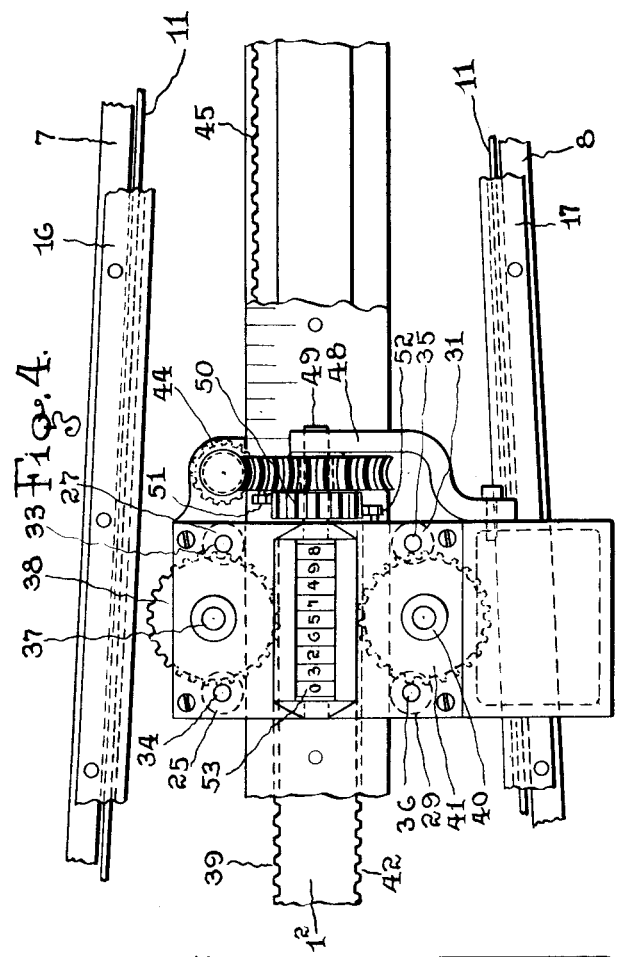
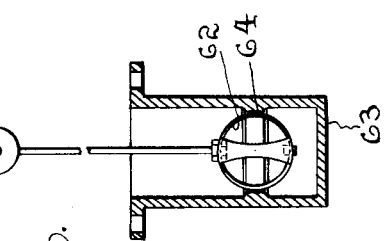
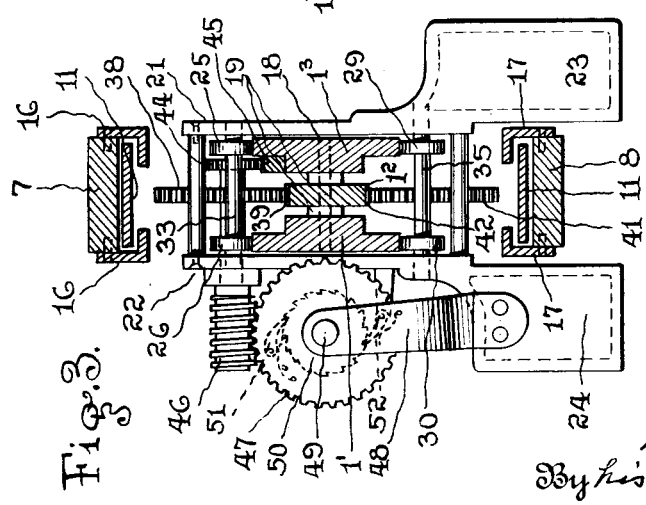
Inventor
David John Mills
By his Attorney Patented July 2, 1929.

1,719,482

UNITED STATES PATENT OFFICE.

DAVID JOHN MILLS, OF PASSAIC, NEW JERSEY.

WEIGHING MACHINE.

Application filed July 18, 1927. Serial No. 206,522.

My invention relates to improvements in weighing machines.

An object of my invention is to provide in a device of the character described a simple and convenient means for weighing material and articles;

A further object of my invention is to provide means whereby the poise may be conveniently brought to the correct point of equilibrium on the beam;

A further object of my invention is to provide a belt drive for the poise;

A further object of my invention is to provide a new and useful device of the character described in which the weight will be indicated on the poise;

A further object of my invention is to provide means in a weighing machine for limiting the vibration of the beam;

Other objects and advantages of the invention will become apparent during the course of the following description.

It is to be understood that the form of my invention herein shown and described is to be taken as a preferred embodiment of the same, and that various changes in the shape, size and arrangement of parts may be resorted to without departing from the spirit of the invention or the scope of the subjoined claims.

In the drawings,

Figure 1 is a side elevation of the device,

Figure 2 is a plan view of the same with parts broken away,

Figure 3 is a detail of the poise and adjacent parts.

Figure 4 is a side elevation of the same,

Figure 5 is a plan view thereof,

Figure 6 is a sectional view of cylinder and anti-vibrating rod and head, and

Figure 7 is a section on the line 7—7 in Figure 1.

Similar characters of reference refer to similar parts throughout the several views.

My improved device includes a beam 1 vibrating in a vertical plane about a knife edged fulcrum 2 on a support $2^1$ and having a long end and a short end.

On the short end of the beam 1 is provided a rod 4 carried on a knife edge $4^1$ in the beam 1 and adapted to support a platform, not shown, upon which is placed the material or article to be weighed.

At one side of the short end of the beam 1 I provide a post or standard 3, upon which two arms $5^1$ and $5^2$ are slidably mounted and adapted to be locked in the desired position by set screws $5^3$, or other locking means.

These arms $5^1$ and $5^2$ extend respectively over and under the beam 1 and carry the rails 7 and 8 which are positioned respectively above and below the beam 1.

The rails 7 and 8 are carried at their other ends by arms $6^1$ and $6^2$ slidably mounted on a post or standard 6 positioned at one side of the free end of the beam 1. The standard 6 and arms $6^1$ and $6^2$ are preferably counterparts of the standard 3 and arms $5^1$ and $5^2$.

The arms $5^1$ and $6^1$ carry the rail 7 which is positioned above and spaced from the beam 1, and the arms $5^2$ and $6^2$ carry the rail 8 which is positioned below and spaced from the beam 1.

There is a greater span between the arms $6^1$ and $6^2$ than that between the arms $5^1$ and $5^2$ so that the rails 7 and 8 are not parallel but spread or diverge toward the free end of the beam 1. The rail 7 is spaced from and parallel with the beam 1 when the said beam 1 is at its maximum elevation and the rail 8 is spaced from and parallel with the beam when the beam 1 is at its maximum depression.

Beyond the ends of the beam 1 and in its longitudinal plane are provided pulleys 9 and 10 carrying an endless belt 11.

The pulley 9 is the driving pulley and may be conveniently carried on a shaft $12^1$ adjustably positioned on the bracket 12 in a slot $12^2$ which is adjustably supported at one end by a sleeve $12^3$ on the post 3 and at its other end by a bolt $12^4$ in a slot $12^5$ in the post $12^6$, the pulley 10 is an idler and may be conveniently carried on a shaft $13^1$ in the bracket 13 slidably mounted on the post 6.

The pulley 9 is driven by a motor 13 through gears 14, 15.

The rails 7 and 8 are counterparts but in reversed relation and are provided with channels for the belt 11 on the faces thereof which are toward the beam 1. I prefer to form these channels by means of angle irons 16, 17 bolted to the sides of the rails with their flanges turned inwardly and spaced from the face of the rail to permit the belt 11 to travel between the face of the rail and the flanges of the angle irons.

The beam 1 is preferably formed of three parallel spaced rails $1^1$, $1^2$, and $1^3$ which are bound together by means of bolts 18 and spacers 19.

The side rails 1¹ and 1³ of the beam 1 serve as traction rails for the traction wheels or rollers of the poise 20, as hereafter explained, and the central rail 1² is a double rack having teeth on its upper and lower edges for the drive of the poise 20.

The poise 20 is provided with traction wheels or rollers 25, 26, 27, 28, 29, 30, 31 and 32, mounted on shafts 33, 34, 35, and 36, respectively, and which travel on the side rails 1¹ and 1³ respectively of the beam 1.

The side plates 21, 22 of the poise 20 are provided with shot pockets 23, 24 adapted to carry shot or the like whereby the weight of the poise may be variably adjusted as conditions may require.

On the shaft 37 in the poise 20 I provide a toothed traction pinion 38 which engages the rack 39 on the upper edge of the central rail 1² of the beam 1 and projects above the poise 20 sufficiently to contact with the belt 11 when the beam 1 is at its maximum elevation, remaining out of contact with the belt when the beam is lowered.

On the shaft 40 of the poise 20 I provide a traction pinion 41 which engages the rack 42 on the under edge of the central rail 1² of the beam 1 and projects below the poise sufficiently to contact with the belt 11 when the beam 1 is at its maximum depression, remaining out of contact with the belt 11 when the beam is elevated.

The poise 20 is also provided with a shaft 43 carrying a pinion 44 fixed thereon and engaging a rack 45 on the beam 1. On the shaft 43 is a worm 46 which engages a spur wheel 47 which may be carried at the side of the poise 20 on a shaft 49 in the bracket 48. The spur 47 is preferably loose on its shaft and engages and drives in a clockwise direction by means of a pawl 51 a ratchet 50 fixed on the shaft 49, the ratchet 50 being engaged by a pawl 52 to prevent the rotation of the shaft 49 in a counterclockwise direction.

The shaft 49 operates a weight indicator which comprises a plurality of discs having peripheral figures visible at a sight 53 in the poise 20, the discs being adapted to rotate with the shaft 49 to show the weight of the article to be weighed.

The use and operation of such indicator is old and well known and it is not thought necessary to here describe it at length as any desired form of indicator may be used.

As the poise 20 is moved out on the beam 1, its position will be indicated by the numerals on the discs at the sight 53 and as these are adjusted to show the weight of the article to be weighed, it is apparent that when the poise comes to rest at the point of equilibrium of the beam 1, the weight of the article to be weighed will be shown at the sight.

Adjacent the free end of the beam 1, I preferably provide means for limiting the vibration of the beam. For this purpose, I provide transverse levers extending across the plane of the beam both above and below and spaced therefrom so that its operative function will not be interfered with.

Above the beam 1 and spaced therefrom, I provide the transverse lever 54 extending across the vertical plane of the beam 1 and pivot at 55 on the fixed structure. Weights 56, 57 are provided on the lever 54 whereby the lever 54 is normally held in a horizontal position spaced from the beam 1 and across its path of vibration and limits its upward swing.

Below the beam 1 and spaced therefrom, I provide the transverse lever 58 pivoted at 59 to the fixed structure and carrying the weight 60 which normally positions the lever 58 horizontally, whereby the downward swing of the beam 1 is limited and the beam is assisted to come to equilibrium.

For the purpose of further minimizing the vibration of the beam 1, a rod 61 may be provided on the long end of the beam 1, carrying at its lower end a compressible head 62 in a cylinder 63 having a bead 64 on its inner wall. As the beam 1 is depressed the head 64 will frictionally engage the bead 64 and thereby minimize the vibration of the beam.

A rod 65 may be suspended from the long end of the beam 1 to carry a platform or pan 66 for the tare weight, if desired. The device is preferably mounted on a base 70.

The device being thus assembled, the poise 20 will be positioned against the shoulder 67 on the beam 1 and its registering discs will be at zero, the beam 1 being at equilibrium. Adjustment may be made by shifting the weight 68 on the bracket 69.

The belt 11 will be driven by the motor 13 and will be out of contact with the traction pinions 38 and 41 of the poise 20.

When the article to be weighed is placed on the platform carried by the rod 4, the long end of the beam 1 will be elevated, bringing the pinion 38 into contact with the moving belt 11 whereby the poise 20 will be moved out on the beam 1 toward the free end until equilibrium is attained when the beam will fall, contact between the belt 11 and the pinion 38 will be broken and the poise will come to rest with the weight of the article to be weighed shown at the sight 53 of the poise 20.

The article to be weighed being then removed from its platform, the beam 1 will fall and the pinion 41 will contact with the moving belt 11 below the beam 1 whereby the poise 20 will be driven back to its normal position against the shoulder 67 on the beam 1, and the operation is repeated. The device will thus operate automatically and requires no attention as the poise will move out on the beam to the correct point of equilibrium whenever weight is placed on the weighing platform and will automatically return when the weight is removed, the indicator being held against reverse registration as above explained.

Having thus described my invention, what I claim is:

1. In a weighing machine the combination of a pivotally supported beam, a poise thereon, a drive wheel and an endless belt adjacent the beam and adapted to contact with the drive wheel on pivotal movement of the beam to drive the poise.

2. In a weighing machine the combination of a pivotally supported beam, a poise on the beam, a drive wheel and an endless belt adapted to contact with the drive wheel on pivotal movement of the beam to drive the poise and a motor adapted to drive the belt.

3. In a device of the character described the combination of a pivotally supported beam adapted to vibrate in a vertical plane, a poise thereon, a drive wheel on the poise and a belt adapted to contact with the said wheel on pivotal movement of the beam to drive the poise.

4. In a device of the character described the combination of a pivotally supported beam, a rack on the beam, a poise on the beam, a toothed drive wheel on the poise engaging the rack and a belt adapted to contact with the wheel on pivotal movement of the beam to drive the poise on the beam.

5. In a device of the character described the combination of a pivotally supported beam, a poise on the beam, and endless belt adapted to drive the poise on the beam by frictional contact on pivotal movement of the beam and means for positioning the belt.

6. In a device of the character described the combination of a pivotally supported beam, a poise on the beam, propelling means on the poise, an endless belt adapted to contact with said propelling means on pivotal movement of the beam and a motor adapted to drive the belt.

7. In a device of the character described, a poise comprising a rotary member having a series of indicia thereon and means for rotating said rotary member in one direction and for preventing its rotation in a reverse direction and means to co-relate the movement of the rotary member with movement of the poise along the beam.

8. In a device of the character described the combination of a pivotally supported beam, rails thereon, a poise, traction wheels on the poise and adapted to travel on said rails, propelling means on the poise, an endless belt adapted to contact with said propelling means on pivotal movement of the beam and means for driving the belt.

9. In a device of the character described the combination of a pivotally supported beam comprising a plurality of spaced leaves, a rack thereon, a poise, rotors on the poise and adapted to engage said rack and an endless belt adapted to contact with said rotors on pivotal movement of the beam for driving said poise.

10. In a device of the character described, the combination of a pivotally supported beam, a poise thereon, an endless belt adapted to contact with the poise on the pivotal movement of the beam, to drive the poise and means for limiting the vibration of the beam and comprising a plurality of weighted levers positioned transversely of the beam.

11. In a device of the character described, the combination of a beam, a poise thereon, a rotor on the poise, an endless belt adapted to contact with the rotor to drive the poise when the beam is not at equilibrium, means for breaking contact between the poise and the belt when the beam is at equilibrium and means for limiting vibration in the beam, said means comprising a rod on the beam, a compressible head thereon, a member adapted to receive said compressible head and to frictionally engage the same and a lever positioned transversely of the beam and spaced therefrom and weighted to normally hold the lever in a horizontal position.

Signed at Passaic in the county of Passaic and State of New Jersey this 13th day of July A. D. 1927.

DAVID JOHN MILLS.